Figure 1:
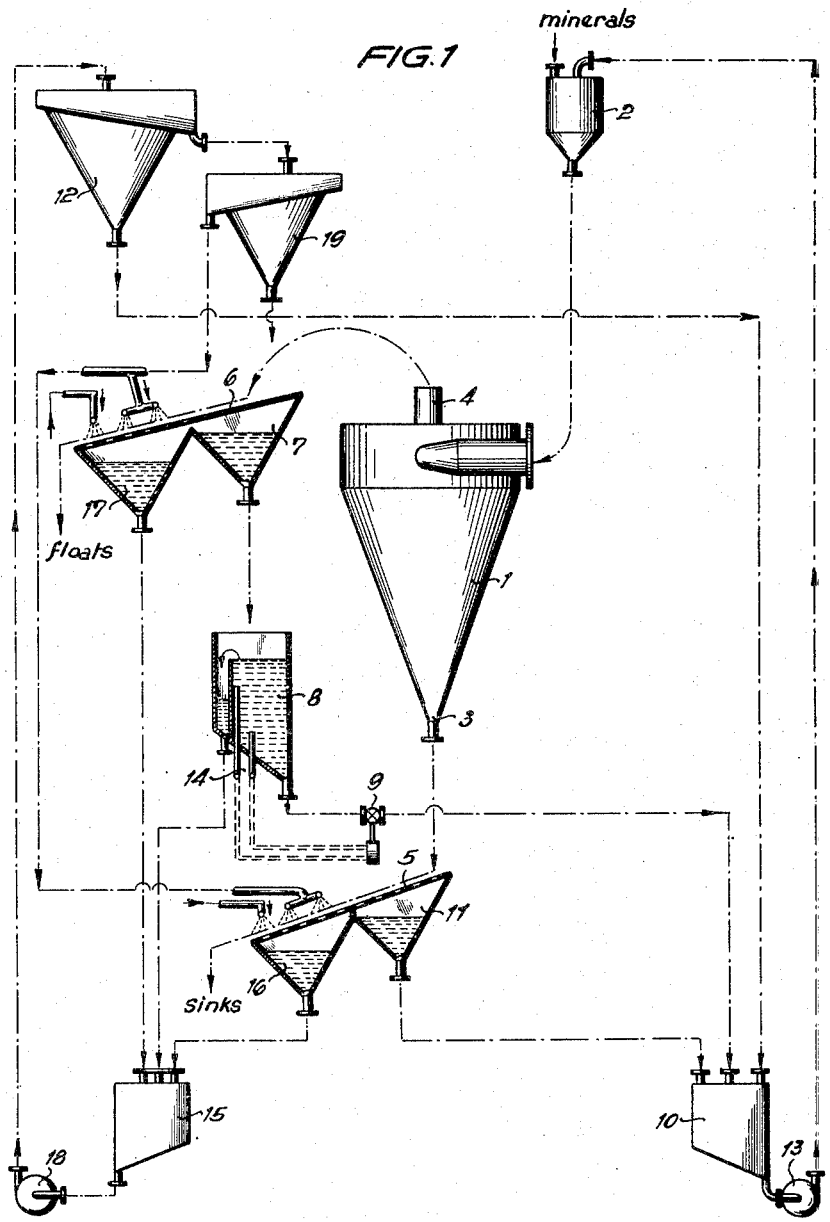

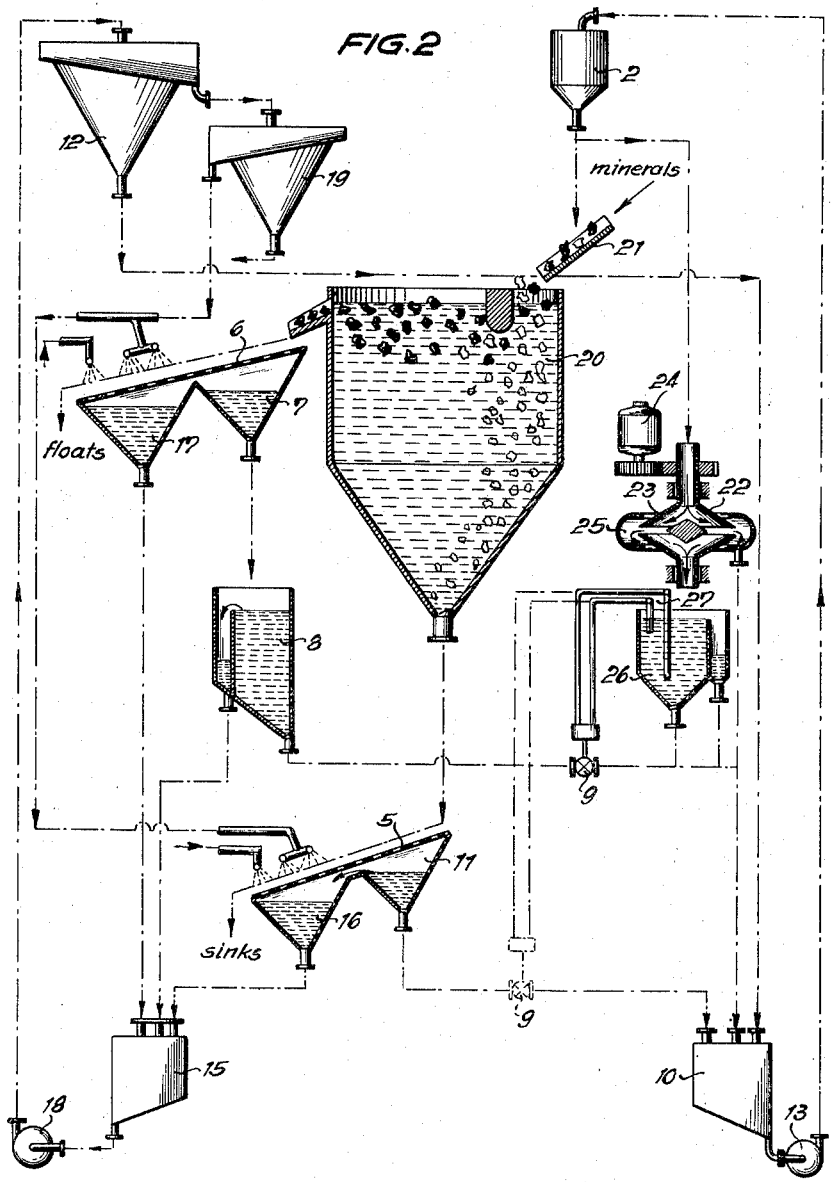

United States Patent Office 2,817,439
Patented Dec. 24, 1957

2,817,439

ADJUSTING THE VISCOSITY OF HEAVY-MATERIAL SUSPENSIONS IN THE DRESSING OF ORES

Rudolf Teuteberg, Dortmund, Germany, assignor to SKB Schuchtermann & Kremer-Baum Aktiengesellschaft fuer Aufbereitung, Dortmund, Germany, a German corporation Application November 10, 1954, Serial No. 468,104

Claims priority, application Germany November 25, 1953

9 Claims. (Cl. 209—172.5)

This invention relates to improvements in adjusting the viscosity of heavy-material suspensions in the dressing of minerals, i. e. coal and ores.

In the dressing of minerals using float and sink separators, the treatment is effected in a heavy liquid which has a specific gravity lying between the specific gravities of the materials to be separated. The heavy liquid generally consists of a suspension of heavy materials. The separatory action is effected by gravity or centrifugal force. The specifically lighter material separated is termed the "float" material, and the specifically heavier material separated is termed the "sink" material.

In the working up of minerals having fine and extremely fine particle sizes, using heavy liquids which consist of suspensions of heavy materials, the viscosity of the suspension plays a decisive role with respect to the separation on the basis of specific gravity. The viscosity of the heavy liquid should be just great enough to assure stability of the suspension of heavy materials which determine the specific gravity of the heavy liquid during the separation. A further increase in viscosity while increasing the stability of the heavy liquid suspension prevents the sinking of the finely granular sink material and thus impairs the separatory action. It is thus desirable to maintain the viscosity of the heavy liquid at a constant value, which is most favorable for the separation.

In the case of sink separators, an increase in the viscosity of the circulating heavy liquid may be observed in practically all cases. This is due to the fact that the components of the material charged are decomposed in the water of the suspension, and in this way form extremely fine sludges which increase the viscosity of the heavy liquid. Prior to the instant invention it was attempted to overcome this difficulty by subjecting a constant portion of the circulating heavy liquid to a cleaning treatment in which the fine sludges were removed. The suspension which constitutes the heavy liquid, after having been cleaned in this manner, is recycled. This method has generally proven sufficient for the separation of coarse particles, which are not particularly sensitive to fluctuations in the viscosity of the heavy liquid. For the separation of fine particles and extremely fine particles, however, this method is not suitable, since only a relatively small difference exists between the velocity of descent of the heavy material in the suspension and the extremely fine, sink material. The most precise adjustment of the viscosity possible is desirable in the case of the separation of fine and extremely fine particles.

One object of this invention is the precise control of the viscosity of the heavy liquid in the dressing of minerals by the float and sink method, using a heavy liquid comprising a suspension of heavy material. This, and still further objects, will become apparent from the following description, read in conjunction with the drawing in which:

Fig. 1 is a flow sheet of an embodiment of the invention using a cyclone type centrifugal sink separator; and Fig. 2 is a flow sheet of a further embodiment of the invention using a gravity operated sink separator.

When a heavy liquid is subjected to the action of centrifugal force, as, for example, in a hydrocyclone, vortex separator, or centrifuge, a classifying action is exerted on the heavy material suspension, and the heavy liquid is divided into two partial streams, one of which contains predominantly the coarse components of the suspension, and the other contains predominantly the very fine components.

It has now been found that with a constant, specific weight of the heavy liquid, the specific weight of the partial stream containing the extremely fine components of the suspension increases as soon as the viscosity of the heavy liquid increases and vice versa. A proportionality thus exists between the fluctuations in weight of this partial stream and the viscosity of the heavy liquid.

In accordance with the invention, these fluctuations in the specific gravity of the partial stream are utilized for the regulation of the viscosity of the heavy liquid.

The heavy liquid is subjected to centrifugal action and a portion thereof is separated as a lighter fraction. The specific gravity of this fraction is constantly determined and a portion of the heavy liquid stream, which is proportional to the fluctuations in the specific gravity of this fraction, is freed from the constituents which cause the increase in viscosity, and recycled to the heavy liquid stream.

The constant determination of the specific gravity of the separated fraction may be effected with a conventionally known means to determine the specific gravity. In this connection, any conventional specific gravity regulator may be used as a viscosity regulator. A specific gravity regulator may control the proportion of the heavy liquid stream which is branched off and freed from the constituents which increase the viscosity, as, for example, a cleaning device. The branched-off portion of the heavy liquid stream may be also added to the spray pulp circuit of the installation and may be freed of its finely granular, viscosity-increasing particles in the thickeners and clarifiers conventionally utilized in this circuit. In this connection, the purified heavy liquid material suspension is returned jointly with the suspension recovered from the spray pulp to the heavy liquid circuit. In this manner, the viscosity of the heavy liquid may be maintained constantly within narrow limits.

When the heavy liquid treatment of the finely granular ores is effected in centrifugal separators, as, for example, cyclones, vortex separators, and centrifuges, the invention may be effected with particular ease, since a partial stream of the heavy liquid charged is constantly discharged with the float material. This heavy liquid stream discharged with the float material contains predominantly the extremely fine viscosity-increasing sludges and therefore exhibits variations in its specific gravity which are proportional to the viscosity of the heavy liquid. This partial, heavy liquid stream discharged from the centrifugal separator with the float material, and may, therefore, in accordance with the invention, have its specific gravity constantly determined, and the adjustment of the heavy liquid may be effected in proportion to the fluctuations thereof.

Referring to Fig. 1 of the drawing, the mineral material such as ore or coal to be treated is mixed with the heavy liquid consisting of a heavy-material suspension, and passed in a uniform flow under pressure from the mixing and charging container 2 to the centrifugal force sink separator, as, for example, the cyclone 1. The specific gravity of the heavy-material suspension passed to the cyclone 1, is maintained constant in the conventional manner by means of a specific gravity regulator of any desired or conventional construction. In the cyclone 1, the ore material and heavy liquid are centrifugally rotated and the charged material is separated in accordance with its specific gravity. The specifically heavier sink material discharges with a partial stream of the heavy liquid at the apex 3 of the cyclone. This partial stream of the heavy liquid contains predominantly the coarse suspension components. The specifically lighter float material is discharged from another partial stream or fraction of the heavy liquid from the base opening 4 of the cyclone on to the screen 6. This partial stream or fraction of the heavy liquid contains predominantly the fine viscosity-increasing components. In the case of viscosity variations of the heavy liquid passed to the cyclone 1, the stream containing the float material exhibits variations in the specific gravity, which are proportional to the viscosity changes.

The partial stream of the heavy liquid separated with the float material obtained in the drainage portion 7 of the screen 6 flows into an overflow vessel 8 and through a regulating valve 9 into the heavy-liquid-collecting tank 10. The partial stream of heavy liquid passing out of the apex 3 with the sink material is passed on to the screen 5. This portion of the heavy liquid, after passing into the drainage part 11, also passed into the collecting tank 10. The heavy liquid from the collecting tank 10 is recycled to the charging container 2 by means of the pump 13.

The regulating valve 9 is controlled by the specific gravity regulator 14 in the overflow vessel 8 in such a manner that with an increase of the specific gravity of the heavy-liquid stream in the overflow vessel 8, the valve is correspondingly closed and with a decrease in the specific gravity the valve is correspondingly opened.

Thus, as the specific gravity in the overflow vessel 8 increases, which indicates increase in viscosity in the charging container 2, the stream of material passed from the flow vessel 8 to the tank 10 is decreased, and the portion of this material passed to the rest of the circuit described below, which removes the viscosity-increasing components before recycling to the collecting tank 10, is increased, and thus the viscosity is constantly adjusted and maintained constant. The portion of the stream of heavy material from the overflow vessel 8 not passed through the regulating valve 9 directly to the collecting tank 10 is overflowed into the sump 15, which also receives the spray pulp from the spray compartments 16 and 17 of the screens 5 and 6, respectively. From the sump 15 the liquid is fed to the pump 18, which pumps into the thickener 12 of conventional construction. This thickener 12 is so operated that it thickens practically only the heavy material and rejects the finely granular viscosity-increasing components throuugh its overflow. The heavy liquid, with these viscosity-increasing components removed, is recycled directly to the collecting tank 10. The overflow from the thickener 12 passes into a clarifier 19, which separates the fine sludge and thickens it. The major portion of the clarifying water of the clarifier is passed to the sprays above the screens 5 and 6. The balance is passed as waste water to a drain. This portion, which is removed from the cycle, is replaced by fresh water passed into the fresh-water showers above the screens 5 and 6, respectively.

In connection with sink separators, which are not operated with centrifugal force, as, for example, gravity-operated sink separators, a small portion of the stream of heavy liquid is passed through a special centrifugal separator, such as a cyclone, vortex separator, or centrifuge, positioned in the line in order to produce the partial stream containing the viscosity-increasing admixtures necessary for the viscosity regulation. The specific gravity meter 14 is then arranged in this partial stream and controls an arrangement corresponding to the device 8 and 9, which feeds a portion of the heavy-liquid stream proportional to the variations in the specific gravity measured to the thickener and shower circuit for cleaning purposes.

An embodiment of such an arrangement is shown in Fig. 2. The mineral material such as ore or coal to be treated is passed by means of the chute 21 in to the gravity type sink separator 20. Heavy liquid from the container 2 also flows into the chute 21 and into the sink separator 20. The sink separator 20 works in the conventional manner with the float material overflowing on to the screen 6 and the sink material passing through the apex to the screen 5. A partial stream of heavy liquid is diverted from the container 2 and flows to the centrifugal separator 22. The centrifugal separator 22 consists of a centrifugal drum 23 which is rotated by the electric motor 24. The drum 23 has peripheral outlet nozzles which discharge into the collecting channel 25. The heavy liquid passes into the drum 23 and is caused to rotate. The heavier components are thrown outwardly by the centrifugal force into the collecting channel 25 while the lighter portions discharge through the bottom axial discharge into the tank 26. The thicker portions of the heavy liquid thus are thrown into the collecting channel 25 and passed to the sump 10, whereas the thinner viscosity-increasing portions of the heavy liquid are discharged into the tank 26. The tank 26 contains the specific gravity indicator or regulator 27 of conventional construction which controls the throttle valve 9 so that, depending upon the specific gravity of the fraction discharged into the tank 26, a greater or smaller portion of the liquid from the compartment 17 will flow through the overflow vessel 8 to the sump 15. The pump 18 conveys this heavy liquid portion together with the material from the compartments 17 and 16 to the thickener and clarifier 12 and 19 as described in detail in connection with Fig. 1. In all further respects the embodiment is identical in construction and operation to the embodiment described in detail in connection with Fig. 1.

Since, when using gravity operated sink separators such as the separator 20, there is practically no difference in the nature of the heavy liquid discharged with the float or the sink material, the throttle valve 9 as indicated by the dotted lines in Fig. 2 may also be positioned in the conduit leading from the compartment 11 to the sump 10. In this connection the compartment 11 must be connected to an overflow vessel 8 or, as illustrated, constructed as an overflow container itself, which overflows into the compartment 16. Depending upon the opening of the throttle valve 9, a greater or lesser extent of the material from the compartment 11 will overflow into the compartment 16 and thus be passed to the sump 15.

When the throttle valve 9 determines the proportion of the sink material passed to the sumps 15 and 10, the conduit from the compartment 7 may lead directly to the sump 15.

I claim:

1. In the method for the dressing of minerals in a sink separator, utilizing a heavy liquid stream maintained at a substantially constant specific gravity, the improvement for regulating the viscosity of the heavy liquid, which comprises centrifugally separating a partial stream predominantly containing the fine-grained, viscosity-increasing components from the stream of heavy liquid, substantially continuously determining any variations in the specific gravity of the separated partial stream predominantly containing the fine-grained, viscosity-increasing components, and substantially continuously removing an amount of finely-granular, viscosity-increasing components from the stream of heavy liquid proportional to the specific gravity of said partial stream.

2. Improvement according to claim 1, in which a portion of the separated partial stream substantially proportional to its specific gravity is freed from the fine-grained, viscosity-increasing components, thereafter recycled to the stream of heavy liquid, and the remainder of the separated partial stream substantially directly recycled to the stream of heavy liquid.

3. Improvement according to claim 1, in which the mineral is dressed in a centrifugal sink separator and in which the separated partial stream is the partial stream from the separator carrying the float material.

4. Improvement according to claim 3, in which a portion of the partial stream of heavy material separated with the float material substantially proportional to its specific gravity is freed from the fine-grained, viscosity-increasing components, and thereafter recycled to the stream of heavy material, and the remainder of the partial stream substantially directly recycled to the stream of heavy liquid.

5. Improvement according to claim 4, in which the proportion of the partial stream freed from the fine-grained, viscosity-increasing components is freed from said components by passing the same to the spray pulp circuit of the separator.

6. In a heavy liquid sink separator system, having means for circulating a stream of heavy liquid at a substantially constant specific gravity through a separator, the improvement which comprises a centrifugal separator positioned for the passage of at least a portion of the stream of heavy liquid therethrough, specific gravity-sensitive means, means for passing heavy liquid separated as the specifically lighter fraction from said centrifugal separator to said specific gravity-sensitive means, and means controlled by said specific gravity-sensitive means for removing an amount of finely-granular, viscosity-increasing components from the stream of heavy liquid proportional to the specific gravity of the heavy liquid passed to said specific gravity-sensitive means.

7. Improvement according to claim 6, including valve means controlled by said specific gravity-sensitive means for dividing the stream of heavy liquid passed to said specific gravity-sensitive means into two partial streams, means for directly recycling one said partial stream to the stream of heavy liquid, cleaning means for removing finely-granular, viscosity-increasing components from heavy liquids, and means for passing said other partial stream through said cleaning means and thereafter to said stream of heavy liquid.

8. Improvement according to claim 7, in which said specific gravity-sensitive means is positioned in an overflow container, said valve means being positioned in a conduit connecting the overflow container to the stream of heavy liquid, and in which said means for passing the other partial stream through said cleaning means are means for passing liquid overflowed from said overflow container to said cleaning means.

9. Improvement according to claim 6, in which the separator in said sink separator system is a centrifugal separator and in which said centrifugal separator positioned for the passage of at least a portion of the heavy liquid therethrough is said separator in said sink separator system.

References Cited in the file of this patent

UNITED STATES PATENTS

| | | |
|---|---|---|
| 2,113,609 | Wuensch | Apr. 12, 1938 |
| 2,532,792 | Svensjo | Dec. 5, 1950 |
| 2,571,835 | Cleeman | Oct. 16, 1951 |

UNITED STATES PATENT OFFICE
CERTIFICATE OF CORRECTION

December 24, 1957

Patent No. 2,817,439

Rudolf Teuteberg

It is hereby certified that error appears in the printed specification of the above numbered patent requiring correction and that the said Letters Patent should read as corrected below.

Column 3, line 9, for "from" read --with--.

Signed and sealed this 11th day of February 1958.

(SEAL)
Attest:

KARL H. AXLINE
Attesting Officer

ROBERT C. WATSON
Commissioner of Patents